(12) United States Patent
Siegel

(10) Patent No.: US 8,100,650 B2
(45) Date of Patent: Jan. 24, 2012

(54) CYCLICAL WAVE ENERGY CONVERTER

(75) Inventor: Stefan Günther Siegel, Pueblo, CO (US)

(73) Assignee: Atargis Energy Corporation, Colorado Springs, CO (US)

( * ) Notice: Subject to any disclaimer, the term of this patent is extended or adjusted under 35 U.S.C. 154(b) by 0 days.

(21) Appl. No.: 12/711,106

(22) Filed: Feb. 23, 2010

(65) Prior Publication Data
US 2010/0150716 A1  Jun. 17, 2010

Related U.S. Application Data

(63) Continuation of application No. 11/484,241, filed on Jul. 10, 2006, now Pat. No. 7,686,583.

(51) Int. Cl.
*B64C 11/00* (2006.01)
(52) U.S. Cl. ............ 416/53; 416/111; 415/3.1; 415/906
(58) Field of Classification Search ............. 415/3.1, 415/4.1, 4.2, 4.3, 4.4, 7, 906, 907, 908; 416/111, 416/53
See application file for complete search history.

(56) References Cited

U.S. PATENT DOCUMENTS

| | | | |
|---|---|---|---|
| 1,835,018 A | 12/1931 | Darrieus | |
| 3,258,074 A | 6/1966 | Blickle et al. | |
| 3,326,296 A | 6/1967 | Hill et al. | |
| 3,639,077 A | 2/1972 | Slates | |
| 3,716,014 A | 2/1973 | Laucks et al. | |
| 3,902,072 A | 8/1975 | Quinn | |
| 3,995,972 A | 12/1976 | Nassar | |
| 4,024,409 A | 5/1977 | Payne | |
| 4,048,947 A | 9/1977 | Sicard | |
| 4,137,005 A | 1/1979 | Comstock | |
| 4,180,367 A | 12/1979 | Drees | |
| 4,210,299 A | 7/1980 | Chabonat | |
| 4,221,538 A | 9/1980 | Wells | |
| 4,247,253 A | 1/1981 | Seki et al. | |
| 4,264,279 A | 4/1981 | Dereng | |
| 4,285,636 A | 8/1981 | Kato et al. | |
| 4,313,711 A | 2/1982 | Lee | |
| 4,329,116 A | 5/1982 | Ljungstrom | |

(Continued)

FOREIGN PATENT DOCUMENTS

WO   WO0040859   7/2000

OTHER PUBLICATIONS

Hermans, A.J. et al., "A Device to Extract Energy From Water Waves" Delft University of Technology, Delft, The Netherlands (1990) pp. 1-5.

(Continued)

*Primary Examiner* — Edward Look
*Assistant Examiner* — Dwayne J White
(74) *Attorney, Agent, or Firm* — David T. Millers

(57) ABSTRACT

Systems and methods use cyclical propellers with dynamic blade angle control to extract power from waves. A control system for such implementations can adapt pitching schedules for the blades of the cyclical propellers for efficient energy extraction and/or to control reactive forces. The cyclical propellers may be installed on the floor of a body of water or other liquid, on a submarine, or on a surface float, and blades may extend vertically or horizontally depending on the character of the waves. Several cyclical propellers can be combined into a single unit operated to minimize net reactive force or torque, to propel the unit horizontally or vertically, and/or to stabilize the unit. Such units can be installed with minimal or no moorings.

22 Claims, 6 Drawing Sheets

U.S. PATENT DOCUMENTS

| | | |
|---|---|---|
| 4,340,821 A | 7/1982 | Slonim |
| 4,347,036 A | 8/1982 | Arnold |
| 4,368,392 A | 1/1983 | Drees |
| 4,380,417 A | 4/1983 | Fork |
| 4,415,312 A | 11/1983 | Brenneman |
| 4,422,845 A | 12/1983 | Yamaguchi |
| 4,430,044 A | 2/1984 | Liljegre |
| 4,443,708 A | 4/1984 | Lapeyre |
| 4,449,053 A | 5/1984 | Kutcher |
| 4,464,578 A | 8/1984 | Masubuchi |
| 4,527,950 A | 7/1985 | Biscomb |
| 4,533,292 A | 8/1985 | Sugihara |
| 4,555,218 A | 11/1985 | Jonsson et al. |
| 4,566,854 A | 1/1986 | Slezak |
| 4,608,497 A | 8/1986 | Boyce |
| 4,622,471 A | 11/1986 | Schroeder |
| 4,630,440 A | 12/1986 | Meyerand |
| 4,656,959 A | 4/1987 | Moisdon |
| 4,672,222 A | 6/1987 | Ames |
| 4,719,158 A | 1/1988 | Salomon |
| 4,732,350 A | 3/1988 | Lamont |
| 4,752,258 A | 6/1988 | Hochleitner et al. |
| 4,808,074 A | 2/1989 | South |
| 4,832,569 A | 5/1989 | Samuelsen et al. |
| 4,914,915 A | 4/1990 | Linderfelt |
| 4,931,662 A | 6/1990 | Burton |
| 5,054,999 A | 10/1991 | Jonsson |
| 5,136,173 A | 8/1992 | Rynne |
| 5,256,034 A | 10/1993 | Sultzbaugh |
| 5,265,827 A | 11/1993 | Gerhardt |
| 5,269,647 A | 12/1993 | Moser |
| 5,311,064 A | 5/1994 | Kumbatovic |
| 5,391,926 A | 2/1995 | Staley et al. |
| 5,462,406 A | 10/1995 | Ridgewell et al. |
| 5,499,904 A | 3/1996 | Wallace |
| 5,577,882 A | 11/1996 | Istorik et al. |
| 5,588,798 A | 12/1996 | Fork |
| 5,642,984 A | 7/1997 | Gorlov |
| 5,703,474 A | 12/1997 | Smalser |
| 5,708,305 A | 1/1998 | Wolfe |
| 5,789,826 A | 8/1998 | Kumbatovic |
| 5,808,368 A | 9/1998 | Brown |
| 5,929,531 A | 7/1999 | Lagno |
| 5,993,157 A | 11/1999 | Perfahl |
| 6,023,105 A | 2/2000 | Youssef |
| 6,036,443 A | 3/2000 | Gorlov |
| 6,109,875 A | 8/2000 | Gross |
| 6,191,496 B1 | 2/2001 | Elder |
| 6,231,004 B1 | 5/2001 | Peebles |
| 6,244,919 B1 | 6/2001 | Valentini |
| 6,293,835 B2 | 9/2001 | Gorlov |
| 6,360,534 B1 | 3/2002 | Denniss |
| 6,388,342 B1 | 5/2002 | Vetterick, Sr. et al. |
| 6,394,745 B1 | 5/2002 | Quraeshi |
| 6,417,578 B1 | 7/2002 | Chapman et al. |
| 6,448,669 B1 | 9/2002 | Elder |
| 6,516,739 B2 | 2/2003 | Bartels |
| 6,622,483 B2 | 9/2003 | Denniss |
| 6,647,716 B2 | 11/2003 | Boyd |
| 6,711,897 B2 | 3/2004 | Lee |
| 6,731,019 B2 | 5/2004 | Burns et al. |
| 6,756,695 B2 | 6/2004 | Hibbs et al. |
| 6,768,216 B1 | 7/2004 | Carroll et al. |
| 6,768,217 B2 | 7/2004 | Chalmers et al. |
| 6,772,592 B2 | 8/2004 | Gerber et al. |
| 6,790,007 B2 | 9/2004 | Gingras et al. |
| 6,840,738 B1 | 1/2005 | Swanberg |
| 6,864,597 B1 | 3/2005 | Ricker |
| 6,872,045 B1 | 3/2005 | Weaver et al. |
| 6,884,020 B2 | 4/2005 | Kaare, Jr. et al. |
| 6,948,910 B2 | 9/2005 | Polacsek |
| 2002/0078687 A1 | 6/2002 | Donnelly |

OTHER PUBLICATIONS

Isshiki, H. et al., "A Theory of Wave Devouring Propulsion" (1st report) Journal of the Society of Naval Architects of Japan (1983) pp. 54-64.

Pinkster, J.A. et al., "A Rotating Wing for the Generation of Energy From Waves" 22nd IWWWFB, Plitvice, Croatia (2007) pp. 165-168.

Terao, Y. et al., "Wave Devouring Propulsion System—From Concept to Trans-Pacific Voyage" Proceedings of the ASME 2009 28th International Conference on Ocean, Offshore and Arctic Engineering (2009) pp. 1-8.

Van Kuik, G., "The Lanchester-Betz-Joukowsky Limit" Wind Energy (2007) No. 10, pp. 289-291.

Wu, T., "Extraction of Flow Energy by a Wing Oscillating in Waves" Journal of Ship Research (Mar. 1972) pp. 66-78.

Biwas, Sumitabh et al., "A New Analytical Model for the Aerodynamic Performance Analysis of Vertical Axis Wind Turbines" Wind Engineering, vol. 19, No. 2 (1995) p. 107-119.

Bose, Neil et al., "Experimental Performance of a Trochoidal Propeller With High-Aspect-Ratio Blades" Marine Technology, vol. 26, No. 3 (Jul. 1989) pp. 192-201.

Brockett, Terry, "Hydrodynamic Analysis of Cycloidal Propulsors", The Society of Naval Architects and Marine Engineers, Presented at Propellers/Shafting '91 Symposium, Virginia Beach, Virginia (Sep. 17-18, 1991) pp. 2-1 to 2-28.

Brulle, Robert V., "Giromill Wind Tunnel Test & Analysis" Proceedings of the Third Wind Energy Workshop, (Sep. 19-21, 1977) Washington, D.C., pp. 775-793.

Chopra, M.G., "Large Amplitude Lunate-tail Theory of Fish Locomotion" J. Fluid Mech. (1976), vol. 74, part I, pp. 161-182.

Chopra, M.G., "Hydromechanics of Lunate-tail Swimming Propulsion", J. Fluid Mech. (1974) part 2, pp. 375-391.

Drees, H.M., "The Cycloturbine and its Potential for Broad Application", Second International Symposium on Wind Energy Systems, Amsterdam, Netherlands, (Oct. 3-6, 1978) pp. E7-81 to E7-88.

Evans, F.C., "Practical Considerations in the Design of a Vertical-Axis Windmill" Second International Symposium on Wind Energy Systems, Amsterdam, Netherlands, (Oct. 3-6, 1978) pp. Z56-Z59.

Fraenkel, P.L., "Power from Marine Currents", Proc. Instn. Mech. Engrs., vol. 216, Part A: J. Power and Energy (2002).pp. 1-14.

Furukawa, Akinori et al., "An Approximate Method for Estimating the Blade Performance of Darrieus-Type Cross-Flow Water Turbines" Memoirs of the Faculty of Engineering, Kyushu University, Fukuoka, Japan, vol. 52, No. 2 (Jun. 1992) pp. 131-144.

Furukawa, Akinori et al., "Theoretical Considerations in an Approximate Method for Estimating the Blade Performance of a Darrieus-Type Cross-Flow Water Turbine" Memoirs of the Faculty of Engineering, Kyushu University, Fukuoka, Japan, vol. 50, No. 1 (Mar. 1990) pp. 1-14.

Greenblatt, David, "Management of Vortices Trailing Flapped Wings via Separation Control" American Institute of Aeronautics and Astronautics, 43rd AIAA Aerospace Sciences Meeting and Exhibit (Jan. 10-13, 2005) Reno, Nevada, pp. 1-22.

Greenblatt, David et al., "Effect of Leading-Edge Curvature and Slot Geometry on Dynamic Stall Control", 1st AIAA Flow Control Conference St. Louis, MO (Jun. 24-26, 2002) pp. 1-19.

Grylls, W. et al., "A Theoretical and Experimental Investigation into the Variable Pitch Vertical Axis Wind Turbine" Second International Symposium on Wind Energy Systems, Amsterdam, Netherlands (Oct. 3-6, 1978) pp. E-9-101 to E9-118.

Healey, J.V., "A Simple Tandem Disk Model for a Cross-Wind Machine" Wind Engineering, vol. 6, No. 3 (1982) pp. 156-165.

Hirsch, I.H. et al., "A Cascade Theory for the Aerodynamic Performance of Darrieus Wind Turbines" Wind Engineering, vol. 11, No. 3, (1987) pp. 164-175.

Holme, O., "A Contribution to the Aerodynamic Theory of the Vertical-Axis Wind Turbine" International Symposium on Wind Energy Systems, St. John's College, Cambridge, England (Sep. 7-9, 1976) pp. C4-55 to C4-72.

Jones, Kevin D. et al., "An Investigation of the Fluid-structure interaction in an oscillating-wing micro-hydropower generator" Dept. of Aeronautics and Astronautics, Naval Postgraduate School, Monterey, California, (2002) pp. 1-10.

Jones, Kevin D. et al., "On Flow Separation Control by Means of Flapping Wings" Biomechanisms of Swimming and Flying, Springer Publishing, Editors: Naomi Kato et al., Chapter 5 (2004).

Jurgens, Dirk et al., "New Hydrodynamic Aspects of Double Ended Ferries With Voith-Schneider Propeller" Second International Conference on Double Ended Ferries, Alesund, Norway (Mar. 10-12, 2003) pp. 1-11.

Kiho, S. et al., "The Power Generation from Tidal Currents by Darrieus Turbine" Dept. of Electrical Engineering, Nihon University, Tokyo, Japan (1996) pp. 1242-1245.

Kim, Seung Jo et al., "Design and Performance Test of Cycloidal Propulsion Systems" American Institute of Aeronautics and Astronautics, AIAA 2003-1786 (Apr. 7-10, 2003) Norfolk, VA pp. 1-11.

Kim, Seung Jo et al., "Design and Development of Unmanned VTOL, Cyclocopter" Seoul National University, Korea, (2004) pp. 1-6.

Kinsey, T. et al., "Aerodynamics of Oscillating Wings and Performance as Wind Turbines" American institute of Aeronautics and Astronautics, AIAA 2005-5094, Ontario, Canada (Jun. 6-9, 2005) pp. 1-15.

Kirke, Brian, "Developments in Ducted Water Current Turbines" Griffith University, Australia, (Aug. 16, 2003) pp. 1-12.

Kirke, Brian, "Evaluation of Self-starting Vertical Axis Wind Turbines for Stand-alone Applications" Griffith University, Australia (Apr. 1998), pp. iii-338.

Kirsten, Frederick, "A New Type of Propeller", SAE Journal (Jan. 1928) vol. XXII, No. 1, pp. 77-80.

Klimas, Paul C. et al., "Four Aerodynamic Prediction Schemes for Vertical-Axis Wind Turbines: A Compendium" Sandia Laboratories, (Jun. 1978) SAND78-0014, pp. 3-20.

Lee, Jung-Sang et al., "The Modifications of Airfoil Shape for Optimal Aerodynamic Performance on Flapping-Airfoil in Low-Reynolds Number Flow" American Institute Aeronautics and Astronautics 41st Aerospace Sciences Meeting and Exhibit (Jan. 8-9, 2003) Reno, Nevada AIAA 2003-421, pp. 1-9.

Mandel, A.C. et al., "The Effects of Dynamic Stall and Flow Curvature on the Aerodynamics of Darrieus Turbines Applying the Cascade Model" Wind Engineering, vol. 18, No. 6, pp. 267-282 (1994).

Mays, I.D. et al., "The Evolution of the Straight-bladed Vertical Axis Wind Turbine" Proc. Brit. Wind Energy Assoc. Conf., London, (Mar. 22-24, 1988) pp. 187-194.

Mays, I. et al., "Performance of the Variable Geometry Vertical Axis Wind Turbine at High and Low Solidities" 1st BWEA Workshop (Apr. 1979) pp. 48-56.

Modi, V.J. et al., "On the Performance of the Savonus Wind Turbine" Journal of Solar Engineering (Feb. 1989) vol. 111, pp. 71-81.

Nilsson, K. et al., "Simulation of Direct Drive Generators Designed for Underwater Vertical Axis Turbines" 5th European Wave Energy Conference, Cork, Ireland (Sep. 17-20, 2003) pp. 1-6.

Obabko, Aleksandr V. et al., "Detachment of the Dynamic—Stall Vortex Above a Moving Surface" American Institute of Aeronautics and Astronautics, 31st AIAA Fluid Dynamics Conference & Exhibit, Anaheim, California (Jun. 11-14, 2001) AIAA 2001-2711, pp. 1-12.

Onda, Masahiko et al., "Cycloidal Ropeller and its Application to Advanced LTA Vehicles" American Institute of Aeronautics and Astronautics 3rd Annual Aviation Technology, Integration and Operations (ATIO) Tech, Denver, Colorado (Nov. 17-19, 2003) AIAA 2003-6832, pp. 1-6.

Riijarvi, Tommi et al., "Experimental Performance and Comparison of Performance Prediction Methods for a Trochoidal Propeller Model" Int. Shipbuilder Prog. vol. 41, No. 426 (1994) 113-136.

Ruys, A.W., "A Comparison of Some Published Results of Tests on Vertical Axis Propellers" Int. Shipbuilder Progress, vol. 13, (Dec. 1966) pp. 399-401.

Sheldahl, Robert E. et al., "Aerodynamic Performance of a 5-Metre-Diameter Darrieus Turbine With Extruded Aluminum NACA-0015 Blades" Sandia National Laboratories, (Mar. 1989) SAND80-0179, pp. 3-41.

Sparenberg, J.A., "On the Efficiency of a Vertical-Axis Propeller", Third Symposium Naval Hydrodynamics, Scheveningen, Netherlands (1960) pp. 45-66.

Sparenberg, J.A. et al., "On the Optimum One-bladed Cycloidal Ship Propeller" Journal of Engineering Mathematics, (Jan. 1969) vol. 3, No. 1, pp. 1-20.

Staelens, Yann et al., "A Straight-Bladed Variable-pitch VAWT Concept for Improved Power Generation" American Institute of Aeronautics and Astronautics 41st Aerospace Sciences Meeting and Exhibit, Reno, Nevada (Jan. 6-9, 2003) AIAA 2003-524.

Strickland, J.H., "A Performance Prediction Model for the Darrieus Turbine" BHRA Fluid Engineering, International Symposium on Wind Energy Systems, Cambridge, England (Sep. 7-9, 1976) pp. C3-39 to C3-54.

Takamatsu, Yasuo et al., "Study on Hydrodynamic Performance of Darrieus-type Cross-flow Water Turbine" Bulletin of JSME, (Jun. 1985) vol. 28, No. 240, pp. 1119-1127.

Vandenberghe, D. et al., "Optimum Pitch Control for Vertical Axis Wind Turbines" Wind Engineering (1987) vol. 11, No. 5, pp. 237-24T.

Vandenberghe, D. et al., "A Theoretical and Experimental Investigation into the Straight Bladed Vertical Axis Wind Turbine With Second Order Harmonic Pitch Control" Wind Engineering (1986) vol. 10, No. 3, pp. 122-138.

Van Manen, J., "Results of Systematic Tests With Vertical Axis Propellers" International Shipbuilding Progress, (Dec. 1966) vol. 13, pp. 382-398.

Van Manen, J. et al., "A New Way of Simulating Whale Tail Propulsion" The National Academy of Sciences, 21st Symposium on Naval Hydrodynamics (1997) pp. 946-958.

Voith-Schneider Propeller (VSP) product brochure, Germany, 4 pages.

Voith-Schneider Propeller Types and Dimensions, Germany, 4 pages.

Von Ellenrieder, Karl D. et al., "Visualization of the Three Dimensional Flow Behind Oscillating Foils" American Institute of Aeronautics and Astronautics 40th AIAA Aerospace Sciences Meeting and Exhibit, Reno, Nevada (Jan. 14-17, 2002) AIAA 2002-0696, pp. 1-6.

Yuan, Weixing et al., "Low-Reynolds-Numbers Unsteady Turbulent Flows Past Oscillating Wings at Angles of Attack Near Stall" American Institute of Aeronautics and Astronautics, 42nd AIAA Aerospace Sciences Meeting and Exhibit, Reno, Nevada (Jan. 5-8, 2004) pp. 1-10.

CYCLICAL WAVE ENERGY CONVERTER

CROSS-REFERENCE TO RELATED APPLICATIONS

This patent document is a continuation and claims benefit of the earlier filing date of U.S. patent application Ser. No. 11/484,241, filed Jul. 10, 2006 now U.S. Pat. No. 7,686,583, which is hereby incorporated by reference in its entirety.

BACKGROUND

Cyclical propellers have been used for propulsion, where they are most commonly known as Voith Schneider propellers, and as windmills, where they are commonly known as vertical axis wind turbines (VAWT) or Darrieus rotors. Another commonly used term is cycloidal propeller, which is named for the path that a blade of the device follows for one particular range of ratios between flow speed and propeller rotation speed. This document adopts the more general term of cyclical propeller, which refers to propellers and turbines with one or more blades that exhibit periodic or variable pitch changes during rotations.

U.S. Pat. No. 1,835,018 to Darrieus in one of the first references to cyclical propellers, describes a rotating disc with one or more blades attached at a radial offset from the shaft of the propeller. FIG. 1 shows one such propeller 100 that mechanically varies the pitch angles of blades 110 as described in U.S. Pat. No. 1,835,018. Blades 110 of propeller 100 have pivot axes 120 running perpendicular to a base 115 and parallel to a central shaft 130 of propeller 100. A mechanism 140 driven by central shaft 130 and attached to blades 110 cyclically changes the pitch of the blades, i.e., the angle between each blade 110 and a line extending from shaft 130 to the pivot 120 of the blade 110. In propeller 100, the variation of the attack angle of blades 110 gives propeller 100 a direction of thrust when blades 110 are all submerged in the fluid. This type of propeller is able to produce torque at shaft 130 for any fluid flow direction passing parallel to base 115 and has been used successfully in vertical axis wind turbine installations.

The ability to extract energy from a fluid flow passing in any direction perpendicular to a main shaft of a propeller is a very important and desirable property for power extraction when the fluid flow direction can vary. The Darrieus' cyclical propellers have this ability and are also relatively simple and therefore inexpensive to construct and operate. However, the Darrieus cyclical propeller lacks a control system and will typically not start to rotate on its own from rest, but rather requires external power to start rotation. This makes such propellers unsuitable for wave power extraction, where the flow velocity varies between zero and maximum velocity for each wave passage. Further, since the maximum blade pitch of these propellers is fixed by the eccentricity between mechanism 140 and the main shaft 130, the Darrieus propeller cannot adjust or adapt to flow fields of different velocities. The propeller will thus have optimal energy conversion ratio for only one flow speed and greatly reduced efficiency if operated at a flow speed different from the optimal flow.

Currently systems for extracting power from waves have mainly relied on an oscillating water column, buoys, or similar floats that move up and down with the passing of each wave. These wave power converters generally have energy conversion efficiencies that are theoretically limited to being less than 50%. More efficient wave energy converters that can approach 100% efficiency are thus sought.

SUMMARY

In accordance with an aspect of the invention, a device that extracts shaft power from water waves can employ one or more cyclical propellers with dynamic blade angle control. An active control system for the device can create and adapt a pitching schedule for the blades of the cyclical propellers as required for efficient energy extraction even when the fluid flow changes directions and speeds during wave cycles. Further, in some configurations, the cyclical propellers can extract energy from both vertical and horizontal fluid flows to achieve high conversion efficiency.

The cyclical propellers can employ a variety of mounting systems depending on the nature of the wave from which energy is being subtracted. The cyclical propellers may be installed, for example, either on the floor of a body of water, on a fully submerged float, or on a surface float or vessel. One specific installation method orients the axis of a propeller vertically and is particularly suited for energy extraction from shallow water waves where the wave energy is predominantly in a horizontal fluid flow. Another installation method orients the axis of the propeller horizontally and is most advantageous for deep water waves where both horizontal and vertical fluid flows are important.

Several cyclical propellers can be combined into a single unit or propeller cluster that is operated to minimize reactive forces and torques. Such units can be installed with minimal or no moorings or other connection to the floor of a body of water. This is advantageous because expensive and/or environmentally intrusive installations are not required. This installation method can also greatly reduce the cost associated with deployment and maintenance of the unit. The action of a propeller cluster can also stabilize a floating or submerged platform to reduce rocking due to wave motion, which provides another application of the invention.

BRIEF DESCRIPTION OF THE DRAWINGS

Use of the same reference symbols in different figures indicates similar or identical items.

DETAILED DESCRIPTION

In accordance with an aspect of the invention, cyclical propellers with dynamic pitching control can efficiently extract energy from water waves for uses such as electricity generation or for stabilization of floating platforms.

Figure 1:
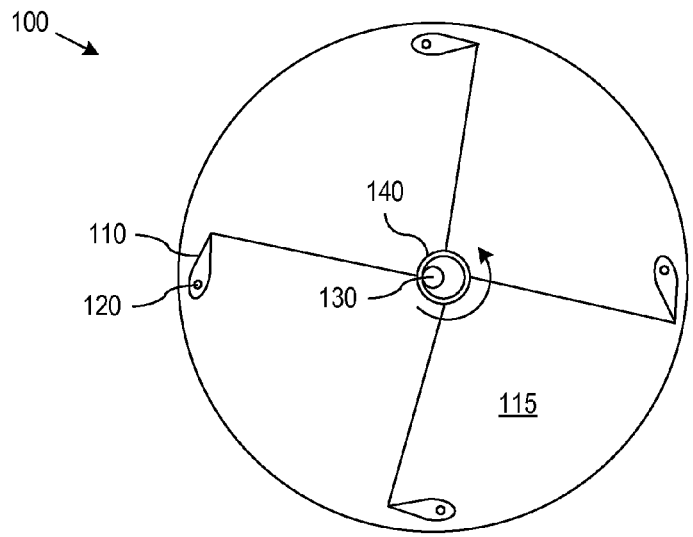
FIG. 1 shows a known cyclical propeller having a pitching schedule fixed by a mechanical linkage.
Figure 2A:
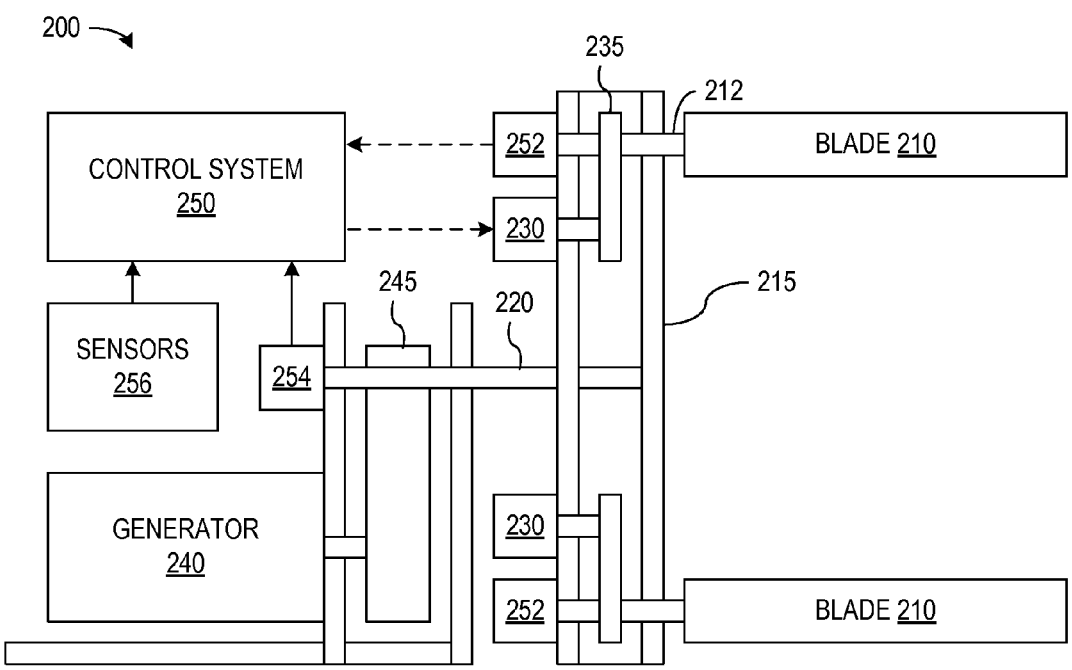
FIGS. 2A and 2B show side and axial views of cyclical propeller system in accordance with an embodiment of the invention including dynamic control of pitching schedules.
Figure 2B:
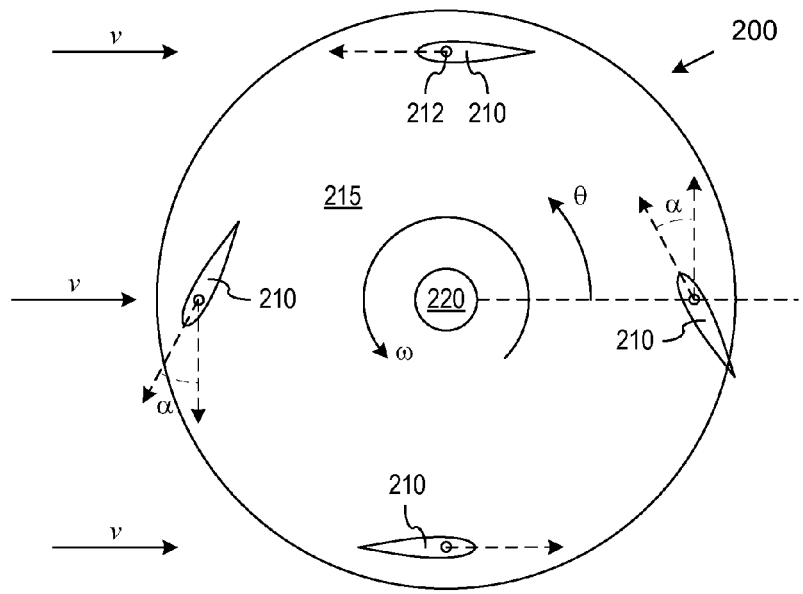

FIGS. 2A and 2B illustrate a cyclical propeller system 200 in accordance with an embodiment of the invention. Propeller system 200 uses blades 210 having a size and number that may be selected according to the desired power transfer by propeller system 200 and the number of similar cyclical propeller systems that may be included in a unit. In operation, each blade 210 will be at least partially submerged or surrounded by water and is preferably fully submerged. Blades 210 are preferably oriented so that the average direction of fluid flow during a wave cycle is predominantly perpendicular to blade shafts 212.

Each blade 210 has a cross-section that is selected to provide a foil having the characteristics required for an expected flow of water during wave action. In general, any type of foil can be employed for blades 210, but the type of foil may influence the particular pitch variation process employed in system 200. At the low flow speeds common for most natural water waves, the particular foil shape is not critical, and with the proper pitching schedule, even flat plates can perform well as blades 210.

System 200 uses an offset mounting of blades 210 so that blades 210 are mounted on a disk or other base 215 at respective radial offsets from a main shaft 220 of propeller system 200. Each blade 210 has a pivot mounting that permits controlled rotation of the blade 210 for example, by a corresponding servo system 230. Each servo system 230 may be constructed using a variety of systems including but not limited to an AC or DC servo motor or a hydraulic or pneumatic system. Servo systems 230 allow blades 210 to be independently rotated with respect to base 215. In the embodiment of FIG. 2A, each servo system 230 uses an associated mechanism 235 such as a transmission, gear system, a belt and pulley system, or the like to rotate a shaft 212 of the corresponding blade 210. Alternatively, a direct drive system is also possible, where the shaft of servo system 230 (e.g., the shaft of an electric servo motor) is directly attached to shaft 212 without a transmission or other additional mechanism 235. An angular position sensor 252 providing a signal indicating the angle of the blade 210 relative to base 215 can also be connected to the shaft 212 of the blade 210.

Figure 3A:
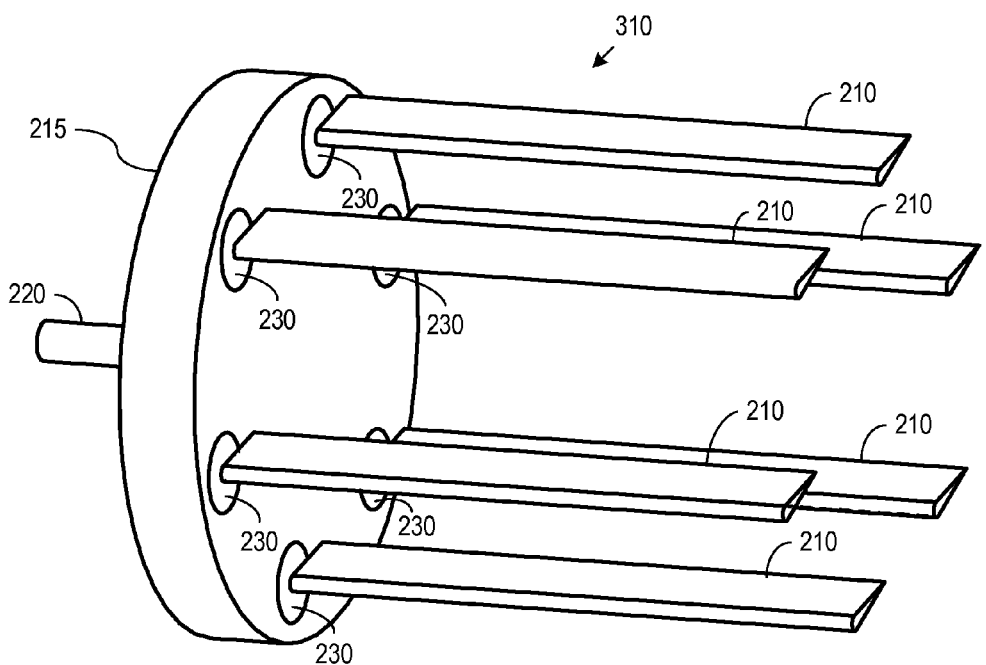
FIGS. 3A and 3B show cyclical propellers in accordance with embodiments of the invention respectively employing a base at only one end of the blades and bases at both ends of the blades.
Figure 3B:
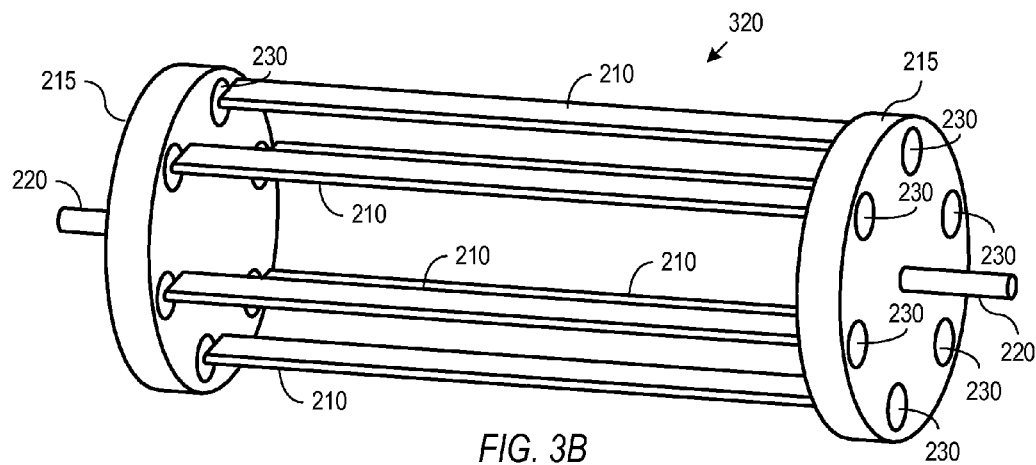
Figure 3C:
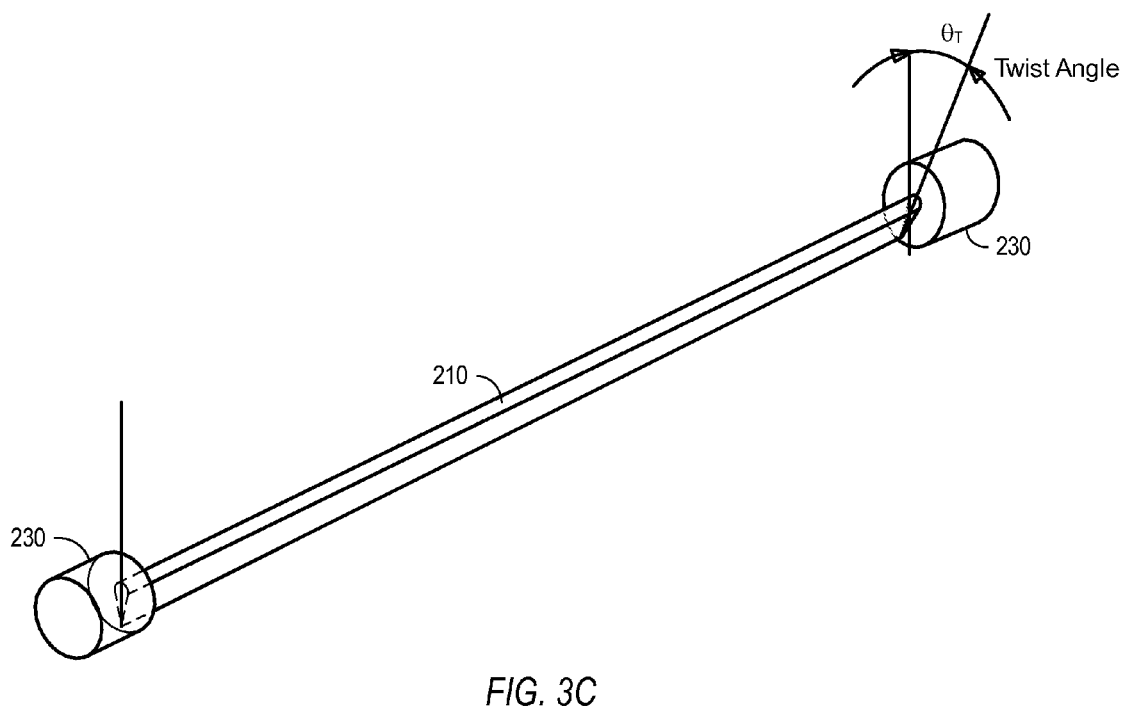
FIG. 3C illustrates blade twist that may be practiced in embodiments of the invention employing servo systems at both ends of a blade.

Blades 210 in system 200 of FIGS. 2A and 2B can attach to bases at one or both ends. FIG. 3A, for example, shows an embodiment of a cyclical propeller 310 in which blades 210 are attached to base 215 only at one end, and FIG. 3B shows an embodiment of a cyclical propeller 320 in which blades 210 are attached to bases 215 at both ends. For propeller 320, either one or two servo motors 230 per blade 210 can be used to control blade pitch angles. Two servo motors 230 acting on the same blade 210 could be synchronized to act in unison when rotating the blade 210. However, as illustrated in FIG. 3C, the two servo motors 230 for a blade 210 could alternatively operate independently within a certain range to twist the blade 210. As a result, the blade angles at opposite ends of a blade 210 can differ by a twist angle $\theta_T$. When using blade twist, blade 210 is preferably soft torsionally while being stiff against bending.

Use of servo systems 230 at both ends of each blade 210 in cyclical propeller 320 of FIG. 3B allows for adjustment blade angles at the ends of propeller 320 for different flow conditions. Propeller 320 can thus be relatively long relative to the scale of variations in the fluid flow along the blade span. Even with identical flow conditions along each blade 210, cyclical propeller 320 can use blade twist to compensate for misalignment with a wave, and using different angles of attack at opposite ends of the blade 210 can effectively realign propeller 320 with the wave. Thus, cyclical propeller 320 may recover the proper alignment even without rotating the entire system when oblique waves are encountered due to, for example, a change in wave direction.

Main shaft 220 in system 200 of FIG. 2A is attached to base or bases 215 that provide a linkage to blades 210, enabling main shaft 220 to conduct the energy transfer between blades 210 and a device 240 such as an electrical generator or other system using shaft power. An optional transmission such as a single stage gear system or similar mechanical drive system 245 is between main shaft 220 and device 240, but alternatively, device 240 may be directly coupled to main shaft 220. In operation, the lift from blades 210 that fluid flow induces creates a torque that turns base 215, main shaft 220, and mechanism 245 to thereby drive device 240, e.g., for electrical power generation or other useful work.

FIG. 2B shows four blades 210 on a base 215 with a view along the direction of main shaft 220. As noted above, other embodiments may include any number of blades 210, and the blades 210 may be attached at one or both ends to bases 215. In FIG. 2B, a blade angle $\alpha$ defines the relative angle of a blade 210 to the tangent of the circle that each shaft 212 follows as base 215 and main shaft 220 rotate. A rotation angle $\theta$ defines the orientation of base 215 and therefore the positions of blades 210 as base 215 rotates. With four blades, FIG. 2B shows blade 210 located 90° apart on base 215 and with blade angles $\alpha$ set for the illustrated direction of fluid flow v.

The attack angle of each blade 210 generally depends on the corresponding blade angle $\alpha$, rotation angle $\theta$, an angular velocity $\omega$ of base 215, and the direction and velocity of free stream fluid flow v. More specifically, the orientation of the base line of a foil of blade 210 depends on angles $\alpha$ and $\theta$, and the attack angle is the angle between the base line of the foil and the direction of the fluid flow at the foil. The fluid velocity at the foil, which is a vector sum of the blade velocity and the free stream fluid flow v, depends on free stream fluid flow v, rotation angle $\theta$, and an angular velocity $\omega$ of base 215. System 200 can vary the blade angle $\alpha$ as necessary to change the attack angle and provide efficient fluid flow around the foil and thus optimal energy transfer.

Both main shaft 220 and blade shafts 212 feature respective angular position sensors 254 and 252 (FIG. 2A) that determine the respective orientations of shafts 220 and 212, e.g., that measure rotation angle $\theta$ and blade angle $\alpha$. Additional sensors 256 can be used to sense properties of the fluid such as the average speed and direction of free fluid flow, so that at any point in time, a control system 250 that controls servo motors 230 can determine the desired pitching schedule for varying the blade angle $\alpha$ of each blade 210 according to the current flow field. Sensors 252 and 254 can be implemented using standard system such as resolvers, tachometers, or encoders of any kind capable of indicating angles. Sensors 256 can measure any desired characteristic of the fluid including but not limited to measuring the fluid flow direction and magnitude. The fluid flow field, for example, would preferably be oriented in any direction normal to main shaft 220 and can be measured using an anemometer of any kind and/or a weather vane type device. Additional sensor systems suitable for sensors 256 are described further below.

Control system 250 of FIG. 2 can be implemented using application specific hardware or a general purpose processing system such as a personal computer programmed to select and control a pitching schedule for varying the angles of blades 210. Control system 250 can be attached to base 215 or be separated from base 215 and communicate with systems 230 and 252 on rotating base 215 via wired or wireless connections. In particular, control system 250 can use the information transmitted from sensors 252, 254, and 256 to determine a pitching schedule, can direct servo motor systems 230 to individually vary the pitches of respective blades 210, and can monitor angular sensors 252 and 254 to determine whether blades 210 are pitching as desired, for example, to generate a desired vortex shedding pattern that provides efficient energy transfer. Values for the tip speed ratio lambdas, which is the ratio between the free stream velocity and the rotational velocity at the blade location, can be selected to be between zero and very large values, covering all of the flow situations encountered during passage of a wave, as discussed below.

Sensors 256 in system 200 of FIG. 2A, as noted above, can sense instantaneous fluid conditions for use by control system 250 during selection of pitching schedules. Several different approaches to fluid sensing can be employed. Traditionally, a weather vane device has been employed to align windmills with the wind direction. While a weather vane works well when the direction of the flow changes gradually in time, a weather vane may not effectively measure a flow that reverses direction instantaneously, as is often the case in wave induced flow fields, especially in shallow water waves. For waves, the flow generally changes direction by 180° twice with each wave passage. In case of instantaneous directional changes, a weather vane may be very slow and erratic in detecting the direction reversal, since the flow speed at this instant of time is small, and the flow after reversal is in the direction of the vane, thus creating small to no moment to turn the vane around. Thus, a weather vane type device may not be well suited for the detection of the wave flow direction.

Figure 4:
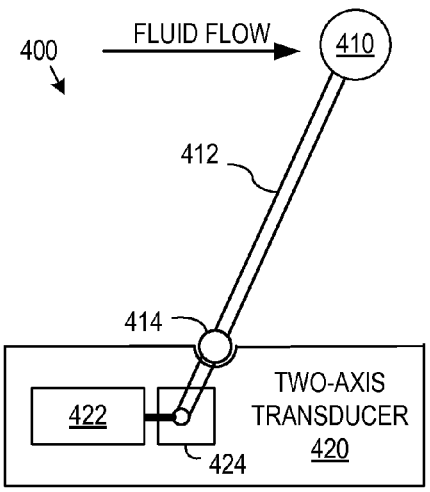
FIG. 4 shows a two-axis flow sensor suitable for use in dynamic control of propeller units in accordance with an embodiment of the invention.

A neutrally buoyant drag inducing object mounted to a pivot point may be better suited to the task of measuring instantaneous fluid velocities. FIG. 4 shows an exemplary sensor 400 that employs a neutrally buoyant object such as a sphere 410 that experiences a drag force in proportion and direction corresponding to the magnitude and direction of the fluid velocity in a plane tangential to surface containing the permitted motion of sphere 410. Sensor 400 can be oriented, for example, to measure fluid flow in a plane parallel to base 215 in system 200 of FIG. 2A. In sensor 400, a rod 412 connects sphere 410 to a pivot point 414 and two force transducers 422 and 424, or a general dual axis force balance directly detects the drag force acting on sphere 410. In either case, both direction and magnitude of a two-dimensional flow vector can be determined. Additionally, stress along the length of rod 412 can be measured if flow information along a third axis is desired.

When the propeller size is small compared to the spatial distribution of the wave induced flow field, a propeller system can use a single sensor of the type shown in FIG. 4 to provide the necessary flow information to the propeller controller for selection of pitch variation. Sensor 400 may be stationary or may be attached to the propeller itself to measure the flow speed in the rotating propeller coordinate system. For a cyclical propeller with long blades or employing blade twist, sensors 400 at either end of the propeller could be used. If, on the other hand, the propeller diameter is large compared to the flow features, a separate flow direction detection sensor 400 may be needed for each individual blade, or at each individual blade end when using blade twist.

One implementation to a cyclical propeller system as described above employs electronic sensing, signaling, and control systems. However, a mechanical linkage between a drag-inducing object such as shown in FIG. 4 and an eccentric blade control mechanism could enable a simple mechanical variable pitch control cyclical propeller with variable blade pitch for the purpose of wave power extraction.

Another approach to sensing the flow field uses the reactive force experienced by each blade. The pitching moment, lift, and drag experienced by a typical foil are functions of the blade's angle of attack and velocity magnitude. Thus, if either the torque experienced by a blade shaft or the forces acting at the pivot point of the blade are measured, the force measurements may be used to directly deduce the instantaneous flow direction at the blade. For example, if system 200 of FIG. 2A uses a typical DC servo motor setup used for servo system 230, the rotational torque on shaft 212 will be proportional to motor current; thus the blade pitching moment may be deduced from the servo motor current if the blade angle is controlled, e.g., kept constant, using a feedback controller. In this fashion, servo systems 230 can measure the pitching moment without additional sensor hardware. Once the pitching moment, lift, or drag are known, sensors 256 can determine the magnitude of the flow velocity, for example, with a simple anemometer.

Yet another approach to measuring flow direction employs the surface pressure distribution around the foils of blades 210 to deduce the angle of attack. By measuring absolute pressure at one, or relative pressure between at least two locations along the surface of a blade 210, the instantaneous lift may be derived, from which the angle of attack can be derived if the flow velocity magnitude is known, which again can be measured using an anemometer.

Sensing the flow direction is generally used for correctly controlling the blade angle of each blade 210 throughout each revolution of base 215. For example, the blade angle $\alpha$ will typically vary cyclically and have minimum and maximum amplitude when the rotational velocity of the blade is parallel or perpendicular to the direction of the fluid flow. The flow velocity magnitude is sensed in order to control the maximum angle of attack of the blade. In general, the magnitude of the changes in blade angle during a cycle of the propeller should be larger for slow free field fluid flow velocities. The sensing methods described above can measure both fluid direction and velocity without additional equipment and permit a control system to select a pitching schedule that varies blade angle $\alpha$ for efficient extraction of wave energy.

The foremost goal of blade angle of attack control traditionally was to prevent the fluid flow from separating from the suction side of the blade, an effect known as stall, which under static conditions leads to a loss of lift and thus loss of efficiency. However, recent research found that a cyclical propeller can use a phenomenon, which is commonly known as dynamic lift, to achieve high lift coefficients when the angle of attack exceeds the stall angle. This mechanism is highly advantageous in flows of low speed such as commonly encountered in wave flows. Co-owned U.S. patent application Ser. No. 11/375,817, which is hereby incorporated by reference in its entirety, provides further description of operation of a cyclical propeller can achieve dynamic lift, which can provide efficient wave energy extraction in embodiments of the current invention.

Cyclical propeller variations described so far are still believed to be subject to the limits and laws of basic momentum theory. Momentum theory states (among other things) that the device to which a propeller is attached experiences a force that is proportional to the amount of energy extracted, and that the force acts in the direction of the fluid flow. This reactive force, which is typically borne by a support structure for a propeller, generally determines the strength requirements for the support structure, for example, the strengths of the tower supporting a conventional windmill. In a conventional watermill extracting energy from a steady ocean current, foundations or anchor points on the sea floor bear the reactive force and are a major cost factor for such watermills. However, the unsteady nature of water waves provides unique opportunities to minimize the supporting structure. In accordance with another aspect of the invention, wave energy converters can employ multiple cyclical propellers in unique systems for deployment in a variety of environments for a variety of types of waves.

While subject to momentum theory, a wave energy converter in the context of linear wave theory acts as a wave generator that is operated in anti-phase to the incoming wave, thus canceling the incoming wave and extracting its energy by superposition of the wave created by the wave energy converter. Thus, the wave energy converter can achieve the theoretical limit of extracting 100% of energy in an incoming wave if the wave energy converter is able to produce an identical, anti-phase wave to the incoming wave. A two-dimensional device as described in this invention is able to achieve this for a two-dimensional wave (at least in theory), while a device like an oscillating water column or buoy in a two-dimensional wave can only achieve a theoretical maximum of 50% efficiency for energy extraction due to the radiation of waves in the direction of the wave crests. This makes the wave energy extraction devices described here superior to current oscillating water column or buoy type devices.

Figure 5:
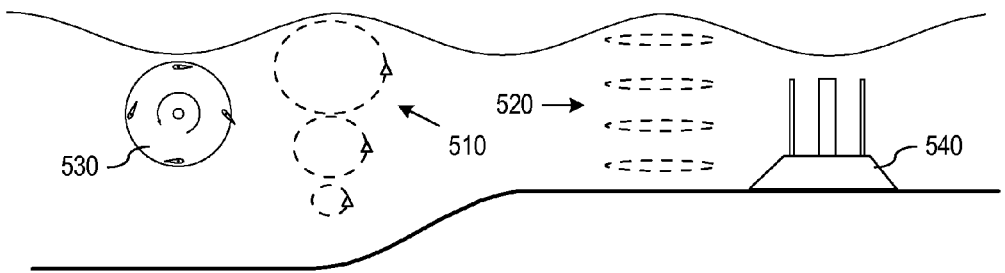
FIG. 5 schematically illustrates wave energy converters for deep water waves and shallow water waves.

Two fundamentally different types of water waves are commonly referred to as shallow water waves and deep water waves. Shallow water waves are characterized by a small water depth to wavelength ratio, while deep water waves have a large water depth to wavelength ratio. While these are two extreme cases, all possible other wavelength to depth ratios will fall in between these extremes. FIG. 5 illustrates both wave types schematically and includes dashed lines indicating flow paths 510 and 520 of water particles during one wave passage. In both cases, the water particles and flows follow closed paths 510 and 520. However, the flow path 510 in a deep water wave is mostly circular, while in a shallow water wave, the particles travel back and forth in horizontal, almost linear paths 520. Embodiments of the invention can extract wave power from both shallow and deep water waves and all cases in between. However, different embodiments and implementations can be optimized for energy extraction from different kinds of waves.

The flow paths 520 of water in the shallow water waves contain most of the wave flow energy in a horizontal motion. In addition, the flow energy in flow paths 520 is more homogeneously distributed in the vertical direction between the sea floor and surface. Thus, a cyclical propeller installed anywhere between the water surface and the sea floor and will be able to extract similar amounts of energy from a shallow water wave. Since the flow field in the direction of travel of the shallow water waves is nearly one dimensional, a cyclical propeller 540 with its axis of rotation in the vertical direction can extract a maximum of the energy. The direction of wave travel often depends on the wind direction, but propeller 540 with vertical blades does not need to be realigned when the direction in which the wave travels changes, since waves traveling along the water surface in any direction will always travel perpendicular to the vertical blades of propeller 540. This allows for a simple installation of propeller 540 as a wave energy converter, for example, by placing propeller 540 on the sea floor as shown in the right portion of FIG. 5. Thus, the support structure of propeller 540 can directly transfer the reactive force resulting from power extraction to the sea floor. Other possible installations include attaching the cyclical propeller to a surface vessel, or a submarine type vessel floating anywhere between the surface and the floor. However, floating installations generally require some kind of anchor point and mooring lines to transfer the reactive force to the sea floor, if only one cyclical propeller is employed.

Figure 6:
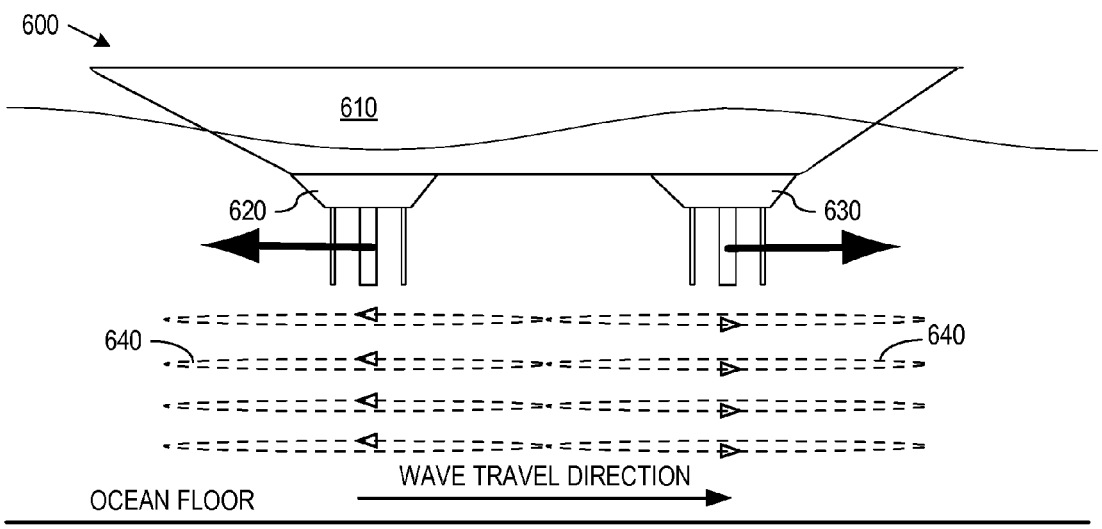
FIG. 6 shows a floating propeller unit in accordance with an embodiment of the invention using two vertical cyclical propellers for energy extraction and balance of reactive forces.

Another embodiment of the invention mounts two or more propellers on a float, a submarine, or a sea bed structure. FIG. 6, for example, illustrates a wave energy converter 600 including a float 610 on which two cyclical propellers 620 and 630 are mounted. In the illustrated embodiment, propellers 620 and 630 have vertical blades that allow efficient energy extraction from the nearly horizontal fluid flow paths 640 of shallow water waves. Cyclical propellers 620 and 630 on float 610 are one half of a wavelength apart, so that during the entire period of the wave, propeller 620 is in a fluid flow that is in the opposite direction of the fluid flow around propeller 630. As a result, the reactive forces experienced by propellers 620 and 630 are in opposite direction and tend to cancel. In particular, if the flow speeds are equal, the reactive force on each propeller 620 or 630 is approximated equal but opposite in direct to the reactive force on the other propeller 630 or 620. This setup is particularly advantageous because float 610 experiences little or no reactive forces that need to be transmitted to the sea bed. In practice, relatively small anchors (not shown) can maintain a fixed position of float 610 by countering effects such as wind and/or ocean currents and any net reactive force. However, active control of the amount of energy extracted by each propeller 620 and 630, e.g., by selection of the blade angle pitch schedules of propellers 620 and 630, can produce a net reactive force in wave energy converter 600 to maintain the position of float 610 by countering the effects of wind and current. Further, the variation of the pitching schedules of cyclical propellers 620 and 630 can be adjusted to use wave power for propulsion of float 610 in a desired direction.

Figure 7A:
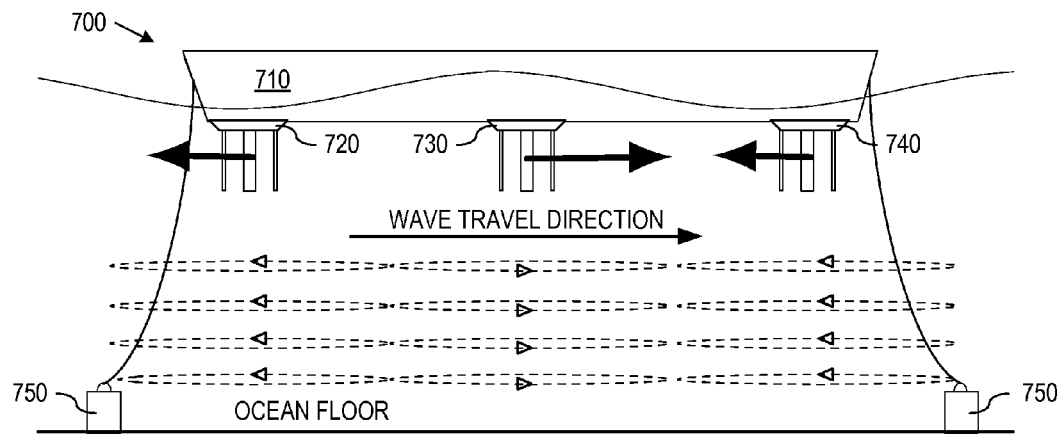
FIGS. 7A, 7B, and 7C respectively show floating, submerged, and sea floor mounted wave energy converters in accordance with embodiments of the invention using multiple vertical-axis cyclical propellers for extracting energy from shallow water waves.

Two cyclical propellers 620 and 630 are sufficient for force cancellation if the cyclical propeller spacing is perfectly matched to the wavelength of the waves. One or both of propellers 620 and 630 can be on moveable mounts that allow converter 610 to adapt to different wavelengths of water waves. However, a wave energy converter can employ three or more propellers to provide greater flexibility that may allow for more efficient energy extraction and cancellation of reactive forces in the presence of waves of varying wavelengths. FIG. 7A, for example, shows a wave energy converter 700 employing a float 710 with three cyclical propellers 720, 730, and 740. All of the propellers 720, 730, and 740 may operate for maximum wave energy conversion ratio, and float 710 may be kept stationary with mooring lines and anchors 750 that make up for the imbalance in reactive forces. In this case, the imbalance in reactive forces is due to odd numbers of propellers and a possible mismatch between the wavelength of the waves and the spacing of the cyclical propellers. Alternatively, a control system (not shown) for wave energy converter 700 or similar system can control the pitching schedules of propellers 720, 730, and 740, so that the vector sum of the reactive forces caused by the separate energy extraction of propellers 720, 730, and 740 balances external forces (e.g., wind and current) on float 710 to keep float 710 stationary or overcomes external forces to move float 710 in a desired direction. The variation of the energy conversion ratio can be employed in multi-propeller energy converter units even when the propeller spacing is less than half a wavelength.

Wave energy converter 700 of FIG. 7A may be altered in a variety of ways in keeping with the present invention. For example, a floating wave energy converter can employ any number and any types of cyclical propellers in a multi-propeller configuration that arranges propellers in one or two dimensional arrays. Even a combination of different cyclical and non-cyclical propeller types is possible. For example, a wave energy converter may include a number of fixed pitch propellers for the majority of energy extraction and a few variable pitch propellers for position maintenance. A single float may employ two or more units, with literally no upper limit. With three or more cyclical propellers, the propellers may lie along a straight line or be arranged in a two dimensional pattern. The floats also may be clustered in order to form wave energy farms for large scale energy extraction.

Figure 7B:
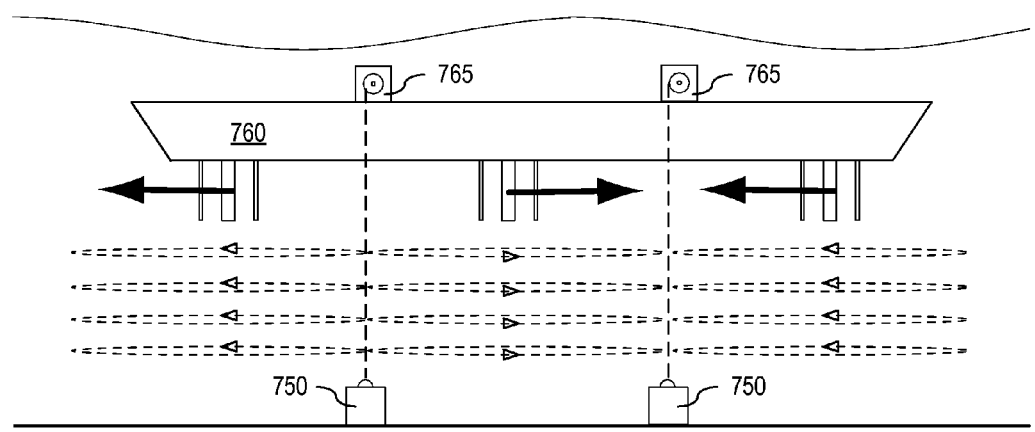
Figure 7C:
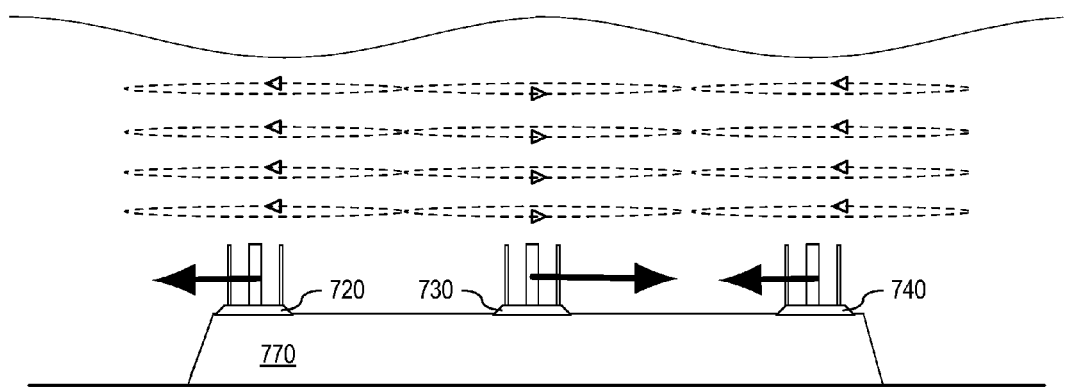

The benefits of reducing reactive forces are not limited to floating systems. For example, multiple cyclical propellers 720, 730, and 740 can be deployed in a submarine configuration as shown in FIG. 7B or on a sea bed as illustrated in FIG. 7C. For the submarine configuration of FIG. 7B, cyclical propellers 720, 730, and 740 are attached to a buoyant platform 760 that is attached to anchors 750 through a system of winches 765. Winches 765 can be operated to allow platform 760 to rise to the surface for maintenance and can control the depth of propellers 720, 730, and 740 for optimal energy extraction. For the sea bed configuration of FIG. 7C, cyclical propellers 720, 730, and 740 are mounted on a common sea bed platform. Even if all propellers 720, 730, and 740 are operated for maximum wave energy conversion ratio, so that the reactive forces do not cancel due to the odd number of propellers, platforms 760 and 770 only require sea bed attachments capable of sustaining the reactive force of one unit, while providing three times the power of an individual unit.

As noted above, if variable pitch schedules are used in a multi-propeller unit, the pitch control mechanism can temporarily reduce the amount of energy extracted by an individual unit to balance the reactive forces. This method cannot only be used to dispense of mooring lines and anchors but can also propel an attached float or submarine in any direction relative to the wave direction. Thus, a wave energy converter that is float or submarine mounted can be a self propelled vessel, allowing for deployment from shore, repositioning of the unit, or even transporting goods or people without any external energy input.

Cyclical propellers with horizontal axis orientation can be used for shallow or deep water wave power extraction but may require active alignment system to keep wave fronts parallel to the blades. As described above, for shallow water waves where fluid flows are predominantly horizontal using vertical blades can avoid the need for alignment systems. In a deep water wave as shown on the left side of FIG. 5, the energy of the water motion is contained equally in vertical and horizontal motion of the water, since the motion of the water particles is circular. Thus, half of the energy in a deep water wave would be inaccessible to a cyclical propeller with a vertically oriented axis because the flow direction is along the axis of the propeller half of the time. A cyclical propeller with an axis that is horizontal and parallel to the incoming waves can more efficiently extract energy from deep water waves. FIG. 5 also illustrates that deep water waves cause a fluid flow that decreases in speed with increasing distance from the water surface, with zero velocity at the ocean floor. This indicates that a good placement of the wave energy converter for deep water waves is close to the water surface. The efficiency statement above which is based on local flow analysis is also backed by the far field linear 2D wave theory, which limits the efficiency of a wave converter that only employs linear motion in one direction to 50% of the wave energy for deep water waves. In contrast, the two-dimensional cyclical wave energy converter described here is able to extract 100% of the wave energy in the theoretical limit.

Figure 8:
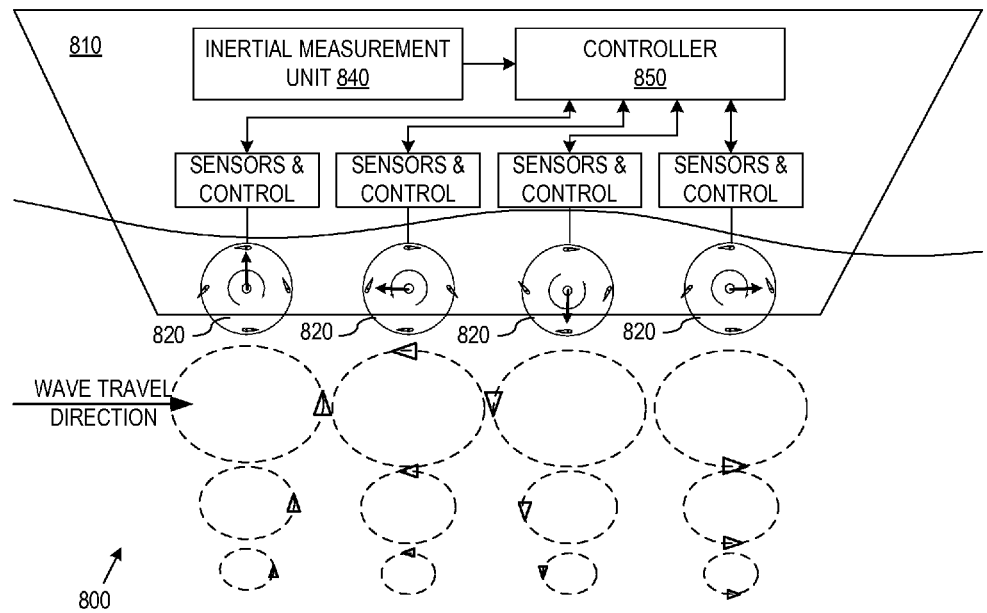
FIG. 8 shows a wave energy converter in accordance with an embodiment of the invention using horizontal cyclical propellers for extracting energy from deep water waves.

FIG. 8 shows a wave energy converter 800 well suited for deep water waves. In converter 800, four cyclical propellers 820 are mounted on a float 810. The reactive forces experienced by the individual cyclical propellers 820 are now within a two dimensional plane corresponding to the flow direct through the propeller during a wave cycle, as shown in FIG. 8. Propellers 820 are positioned with centers a quarter of the wavelength. As a result, each propeller 820 experiences a reactive force that is perpendicular to the reactive experienced by each adjacent propeller 820, and four propellers 820 are sufficient for full force cancellation reactive forces when installed within one full wavelength. The illustrated configuration with four propellers can create an unbalanced torque that rocks float 810. However, more propellers can be employed for force and moment balance, or variable pitch units may control the overall force and moment balance in a similar fashion as described above.

FIG. 8 also illustrates an implementation of a feedback system for controlling the net reactive force on converter 800. The feedback system includes an inertial measurement unit including accelerometers or other devices capable of measuring the direction and magnitude of the acceleration of float 810. In operation, controller 850 receives an acceleration measurement from measurement unit 840 and responds by changing the pitching schedules for propellers 820. In particular, controller 850 communicates with sensor and control systems of the respective propellers 820 to determine which propellers are currently experiencing reactive forces with components along or opposite to the direction of the measured acceleration. In particular, each of the main shafts of cyclical propellers 820 may be equipped with a sensor that measures the horizontal and vertical components of force acting on the propeller. Controller 850 processes these measurements, and sends control signals to the individual propellers 820 to produce a counteracting force to balance the overall force budget. In particular, controller 850 can change the pitching schedules to reduce the conversion ratio of propellers 820 with reactive force components in the acceleration direction and/or to increase the conversion ratio of propellers with reactive force components opposite to the acceleration direction. The directions of the reactive force on each propeller 820 rotates with the wave frequency, so that for a constant operating environment, each propeller 820 may operate on the pitching schedule including a first component that oscillates with the rotational frequency of the propeller and a second component that oscillates with the wave frequency.

In the example shown, a small upward force on one propeller 820 (e.g., the first) and a larger downward force on another propeller 820 (e.g., the third) would add to a net downward force, causing platform 810 to sink deeper into the water. Also, since the forces are not symmetric to the presumed center of gravity of the float in its lengthwise center, the float would pitch upward. Controller 850 would thus need to create a positive upward force on the fourth propeller to balance both the forces and moments. Controller 850 cannot use the forces measured in propellers 820 to detect secondary forces acting on platform 810, for example, caused by impinging winds or surface waves. In order to improve the setup, inertial measurement unit 840 detects the pitching rate and any vertical or horizontal acceleration of platform. By adding this input from unit 840 to information processed by controller 850, controller 850 can balance all forces acting on the platform. Inertial measurement unit 840 could be used in lieu of the force sensors in propellers 820 since measurement unit 840 can detect the net force acting on platform 810. However, the combined system is advantageous due to redundancy as well as sensor noise considerations. While in the example only stabilization of the platform around the horizontal axis into the drawing plane is demonstrated, this concept may be extended to achieve stabilization around all three spatial axes, as well as position keeping in all three spatial directions which is usually referred to as 6 degree of freedom position control.

The horizontal axis cyclical propellers illustrated for deep water use can also extract energy from intermediate water waves. Intermediate water waves contain less energy in the vertical direction as the path of the water particles becomes elliptical with the minor axis of the ellipse in the vertical and the major axis in the horizontal direction. Nonetheless, all of the energy is directed normal to the propeller axis and is thus accessible for conversion.

Figure 9:
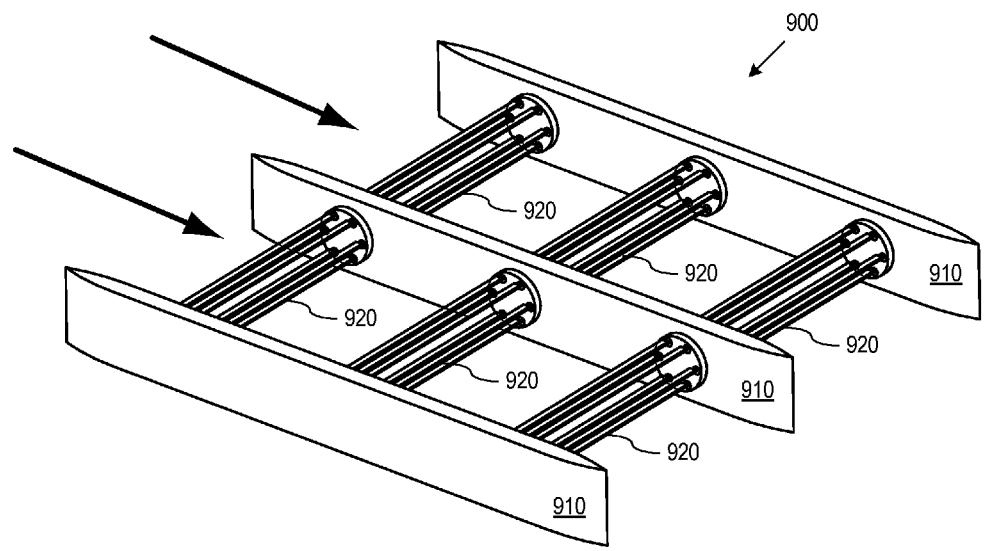
FIG. 9 shows a wave energy converter in accordance with the invention that adjusts pitching schedules to rotate or move the converter.

The axis of the horizontal propellers should be aligned parallel with the direction of the wave crests for optimal energy extraction. Alignment can be accomplished by mooring the unit correctly, but the mooring lines would need readjustment if the waves change direction. Another option, which is mentioned above, uses a cyclical propeller that employs blade twist. Yet another embodiment uses a cluster including at least two propellers with axes aligned. FIG. 9, for example, shows a wave energy converter 900 including six horizontal axis cyclical propellers 920 mounted on three floats or pontoons 910 in a configuration two propellers wide by three propellers in the wave travel direction. Converter 900 can realign (e.g., rotate) itself parallel to the wave crests by balancing the reactive forces on the left and right side appropriately. In the same manner as illustrated in FIGS. 7A and 7B, pontoons 910 at the ends of propellers 920 can be used either to keep converter 900 floating on the water surface or to keep converter 900 submerged to protect converter 900 from damaging breaking surface waves and wind in the case of a storm. In the same fashion as for the shallow water wave clusters, converter 900 can propel itself for deployment and repositioning by controlling the pitching schedules to adjust the energy conversion ratio of the cyclical propellers.

The different arrangements locating wave energy converters at the surface, submerged, or on the sea floor have relative advantages and disadvantages. In terms of ease of maintenance, a surface float mounted wave energy converter is optimal. The disadvantage of the surface float mounting lies in the exposure to the often violent air-water interface, which may make the converter vulnerable to wind or breaking surface waves, especially in the presence of storms. On the other hand, the sea bed mounting poses environmental impact problems and is not applicable at all for deep water wave energy extractions. These problems indicate that an intermediate or submarine mounting elevation might be most beneficial. A simple means to achieve this would be to attach heavy anchors to a slightly positively buoyant assembly using cables that are shortened to less than the water depth as illustrated in FIG. 7B and discussed above. This setup can keep the wave energy converter at a set level below the sea surface, but would in case of severing of the steel cables have the unit return to the surface preventing a loss. The unit could also be floated on the surface for maintenance and deployment.

A horizontal axis cyclical propeller assembly that is about neutrally buoyant can be kept dynamically at a set or adjustable depth by balancing the vertical reactive forces using positional feedback control as described above. The depth could, for example, be adjusted depending on wave height, in order to protect the converter from storms or extract the maximum energy in light wave conditions. While technically more complex, these advanced mooring options provide distinct advantages in their ability to survive adverse surface weather conditions. Converter 800 of FIG. 8 for example, can use four horizontally mounted cyclical propellers 820 to stabilize the mounting float 810 or to produce lateral or vertical reactive forces to change the position or depth of converter 800.

In addition to the capabilities of the horizontal axis cluster described above, control over the vertical reactive forces can be used to dynamically stabilize the entire unit at a set vertical level, providing a platform that does not sway or rock in the presence of waves. This feature may be used beyond energy extraction for improved aircraft carrier type operations, oil drilling, or artificial islands that may be inhabited or uninhabited outposts in the middle of the ocean without any need for external power.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A system comprising:
a platform for use in a liquid;
a plurality of cyclical propellers mounted on the platform; and
a control system connected to control pitching cycles respectively of the cyclical propellers, wherein the control system adjusts the pitching cycles to set respective ratios at which the cyclical propellers extract energy from waves in the liquid and thereby controls reactive forces on the cyclical propellers.

2. The system of claim 1, wherein the control system sets the respective ratios of the cyclical propellers to control a net reactive force on the cyclical propellers.

3. The system of claim 2, wherein the control system minimizes the net reactive force.

4. The system of claim 2, wherein the control system controls the net reactive force to oppose an external force on the system.

5. The system of claim 2, wherein the control system controls the net reactive force to propel the platform.

6. The system of claim 2, wherein the control system controls the net reactive force to change a depth of the cyclical propellers.

7. The system of claim 1, wherein the control system controls the reactive forces to stabilize the platform.

8. The system of claim 1, wherein the platform floats at a surface of the liquid.

9. The system of claim 1, wherein the platform is mounted on a floor of a body containing the liquid.

10. The system of claim 1, wherein the platform is submerged in the liquid and resides between a surface of the liquid and a floor of a body containing the liquid.

11. The system of claim 1, wherein at least one of the cyclical propellers has blades that extend vertically into the liquid.

12. The system of claim 1, wherein at least one of the cyclical propellers has blades that extend parallel to a surface of the liquid.

13. The system of claim 12, wherein the plurality of cyclical propellers comprises a plurality of rows of cyclical propellers having horizontal blades, and the control systems sets the conversion ratios of the cyclical propellers as required to align blades of the cyclical propellers with waves in the liquid.

14. The system of claim 1, wherein the platform is a central platform in a plurality of platforms, and wherein the plurality of cyclical propellers includes:
  a first set of cyclical propellers mounted between the central platform and a first platform in the plurality of platforms; and
  a second set of cyclical propellers mounted between the central platform and a second platform in the plurality of platforms.

15. A method for operating a system including a platform on which a plurality of cyclical propellers are mounted, the method comprising:
  placing blades of the cyclical propellers into a liquid on which waves propagate; and
  adjusting pitching cycles of the blades to set ratios with which the cyclical propellers extract energy from the waves and to thereby control reactive forces on the cyclical propellers.

16. The method of claim 15, wherein the reactive forces are controlled to propel the system.

17. The method of claim 15, wherein the reactive forces are controlled to stabilize the platform.

18. The method of claim 15, wherein the control system controls the net reactive force to oppose an external force on the platform.

19. The method of claim 15, wherein the reactive forces are controlled to propel the platform.

20. The method of claim 15, wherein the reactive forces are controlled to change a depth of the cyclical propellers.

21. A wave energy conversion system comprising:
  a cyclical propeller including:
  a main shaft;
  a first base attached to rotate with the main shaft;
  a set of one or more blades, each of the blades being located at an offset from the main shaft; and
  a first set of rotation systems that respectively attach first ends of the blades to the first base, wherein each of the rotation systems is capable of rotating a corresponding one of the blades about an axis of the blade to control a blade angle of the blade;
  a sensor system that measures a force required for one or more of the rotation systems to rotate one or more of the blades; and
  a control system that selects pitching cycles for the blades during wave energy conversion, wherein the pitching cycles selected depend on measurements from the sensing system.

22. The system of claim 21, wherein the measurement of the force from the sensor system indicates a fluid flow, and the control system adapts an amplitude and a frequency of each pitching cycle according to the fluid flow.

* * * * *